US012325042B2

(12) United States Patent
Schneider

(10) Patent No.: US 12,325,042 B2
(45) Date of Patent: Jun. 10, 2025

(54) COMMON HEAD HAVING AN OFFSET PARTITION FOR USE WITH MULTI-COMPONENT DISPENSING TOOLS AND A TUBULAR LINER ARRANGED FOR LOCATING WITHIN THE COMMON HEAD

(71) Applicant: Albion Engineering Company, Moorestown, NJ (US)

(72) Inventor: Mark C. Schneider, Moorestown, NJ (US)

(73) Assignee: Albion Engineering Company, Moorestown, NJ (US)

( * ) Notice: Subject to any disclaimer, the term of this patent is extended or adjusted under 35 U.S.C. 154(b) by 0 days.

(21) Appl. No.: 18/417,539

(22) Filed: Jan. 19, 2024

(65) Prior Publication Data

US 2024/0149283 A1 May 9, 2024

Related U.S. Application Data

(62) Division of application No. 16/938,583, filed on Jul. 24, 2020, now Pat. No. 11,896,993.

(51) Int. Cl.
*B05B 7/08* (2006.01)
*B05B 7/04* (2006.01)
*B05B 15/18* (2018.01)

(52) U.S. Cl.
CPC .......... *B05B 7/0876* (2013.01); *B05B 7/0408* (2013.01); *B05B 15/18* (2018.02)

(58) Field of Classification Search
CPC ..... B05B 7/0876; B05B 7/0408; B05B 15/18; B05C 17/0123; B05C 17/00583; B05C 17/015; B05C 17/00596; B05C 17/00553
See application file for complete search history.

(56) References Cited

U.S. PATENT DOCUMENTS 4,871,090 A 10/1989 Hoffmann
5,184,757 A * 2/1993 Giannuzzi ......... B05C 17/00506 222/323
5,697,524 A * 12/1997 Sedlmeier ........... B01F 33/5011 222/326

(Continued)

OTHER PUBLICATIONS

Hilti. "HIT-HY 200-A V3 Adhesive Anchor." Hilti USA, 2025, https://www.hilti.com/c/CLS_FASTENER_7135/CLS_CHEMICAL_ANCHORS_7135/r14406294. (Please see the Transmittal Sheet submitted herewith for additional information).

*Primary Examiner* — Bob Zadeh
(74) *Attorney, Agent, or Firm* — Design IP

(57) ABSTRACT

A common head for use in combination with a cartridge assembly, the cartridge assembly being retained within the material containment unit of a dispensing device and arranged to discharge reactive components from larger and smaller cartridges in response to actuation of the dispensing device. The common head includes inlet openings and a rigid walled tube having a partition positioned therein to define larger and smaller pathways to enable passage of the reactive components from the cartridges into and though the common head in a predetermined volumetric ratio and prevent backflow of the components which can lead to unintended curing prior to dispensing. A flexible liner arranged for positioning within one or both pathways of the rigid walled tube is also provided to prevent such backflow and unintended curing prior to dispensing.

13 Claims, 15 Drawing Sheets

(56) References Cited

U.S. PATENT DOCUMENTS

| | | | | |
|---|---|---|---|---|
| 6,129,244 | A * | 10/2000 | Horth ................ | B05C 17/00566 222/326 |
| 6,523,992 | B1 * | 2/2003 | Bublewitz ............ | A61C 9/0026 366/326.1 |
| 7,510,546 | B2 | 3/2009 | Baessler et al. | |
| 8,028,859 | B2 | 10/2011 | Paetow et al. | |
| 8,042,926 | B2 | 10/2011 | Ostermeier et al. | |
| 8,162,179 | B2 | 4/2012 | Willner et al. | |
| 8,313,006 | B2 | 11/2012 | Willner et al. | |
| 10,166,570 | B1 * | 1/2019 | Lee ......................... | G01F 23/02 |
| 10,287,061 | B2 | 5/2019 | Dierker et al. | |
| 10,518,956 | B2 | 12/2019 | Wolf et al. | |
| 11,639,241 | B2 | 5/2023 | Willner et al. | |
| 11,975,353 | B2 | 5/2024 | Ayrle | |
| 11,999,554 | B2 | 6/2024 | Donner et al. | |
| 2008/0187253 | A1 * | 8/2008 | Willner ............. | B05C 17/00586 383/38 |
| 2009/0122123 | A1 | 5/2009 | Ostermeier et al. | |
| 2009/0277926 | A1 | 11/2009 | Schell | |
| 2010/0027918 | A1 * | 2/2010 | Willner ............. | B05C 17/00559 383/105 |
| 2010/0059547 | A1 * | 3/2010 | Schell .................. | B65D 81/325 222/326 |
| 2010/0108709 | A1 * | 5/2010 | Frey .................. | B05C 17/00583 222/105 |
| 2014/0117045 | A1 * | 5/2014 | Varga ................ | B01F 25/43161 222/145.5 |
| 2017/0356582 | A1 * | 12/2017 | Pappalardo ............. | F16L 47/20 |
| 2021/0394989 | A1 * | 12/2021 | Seiler ..................... | B65D 83/00 |
| 2022/0379340 | A1 | 12/2022 | Ayrle et al. | |
| 2024/0149283 | A1 * | 5/2024 | Schneider ............. | B05B 7/0876 |

* cited by examiner

COMMON HEAD HAVING AN OFFSET PARTITION FOR USE WITH MULTI-COMPONENT DISPENSING TOOLS AND A TUBULAR LINER ARRANGED FOR LOCATING WITHIN THE COMMON HEAD

CROSS-REFERENCE TO RELATED APPLICATIONS

This application is a divisional of U.S. patent application Ser. No. 16/938,583 filed on Jul. 24, 2020, which is incorporated by reference as if fully set forth.

BACKGROUND

The invention relates to common heads arranged for use in combination with various types of multi-component tools that dispense viscous adhesives and other reactive materials. The multi-component tool may be of a type that includes a carriage assembly arranged to receive a dual-barrel or dual-tube cartridge assembly, with each tube of the cartridge assembly having been preloaded with a reactive component to be mixed upon dispensing. Alternatively, the multi-component dispensing tool may be of a type that includes a pair of side-by-side barrels, with each barrel arranged to receive a sausage preloaded with a reactive component to be mixed upon dispensing. As a further alternative, the multi-component dispensing tool may be of a type that includes a pair of side-by-side barrels, with each barrel arranged to receive and dispense therefrom a reactive component in bulk form to be mixed upon dispensing. These types of multi-component dispensing tools may dispense the reactive materials in various ratios including 1:1, 2:1, 4:1 and 10:1, and various other ratios that are commercially available, or may become commercially available.

The reactive materials may be chemically reactive resins or a resin and a hardener, which must be maintained separately and out of contact with each other within the multi-component dispensing tool so that when mixed, they chemically react to cause curing of the resin and hardening to form a final product. Where the reactive materials are dispensed from a dual-tube cartridge assembly, the cartridge assembly may be disposable, or re-usable. The reactive materials may include caulks, two-component acrylics, sealants, polyurethanes, epoxies and adhesives. The reactive materials are used in a broad range of applications including but not limited to construction joint fillers, crack injection, adhesive installation and bolt setting. It is desirable that the multi-component dispensing tool dispenses the two materials in a preset, accurately controlled relationship to ensure that the proper chemical reaction takes place when forming the final product, since the final product can be greatly affected by an unbalanced ratio of the two component products.

Where reactive materials are to be dispensed from a dual-tube cartridge assembly, each tube of the cartridge assembly is of a standard size and configuration and comprises a cylindrical body portion containing a reactive component to be dispensed. Each cartridge tube includes a plunger slidably seated against the inside face of the tube wall. The plunger may be cup-shaped, and may be arranged to be moved in a forward ejecting direction to expel the reactive component contained within the cartridge tube. For each type of multi-component dispensing tool described above, the tool usually includes a pneumatic, hydraulic, electro-mechanical, electro-magnetic, manual or other type of actuation system for simultaneously dispensing the two reactive components from their respective cartridge tubes. Typically the actuation system utilizes a piston connected to a rod that applies force axially against the plunger to expel the reactive components contained within their respective cartridge tubes. The cartridge tubes are typically supported on the carriage assembly which is located at the forward section of the multi-component dispensing tool.

The dual tube cartridge assemblies may include tubes having the same capacity, e.g., 100×100 ml or 750×750 ml, or alternatively, may include tubes having different capacities, e.g., 300×150 ml. Other multi-component dispensing tools may be arranged for retaining cartridge assemblies that are of the same capacity, and convertible to retaining cartridge tubes having different capacities. Typically, where the cartridge tubes are of different capacities, they will have equal lengths, but unequal cross-sectional sizes. The cartridge tubes may be joined together in side-by-side relationship and packaged in combination with a common head that is integral with or joined to both cartridge tubes. The assembly includes a common head through which both reactive components pass. For example, an epoxy resin may be contained within a cartridge tube having a larger capacity (and larger cross-sectional size), and a hardener component may be contained within a cartridge tube having a smaller capacity (and smaller cross-sectional size). With the cartridge assembly situated within the carriage assembly of the multi-component dispensing tool, upon actuation, the drive rods of the dispensing tool move in the forward ejecting direction and force the reactive components from the cartridge tubes and through the single common head and into a mixing chamber, e.g., a static mixer, where the reactive components are mixed in an appropriate ratio and dispensed.

As mentioned above, alternatively, the multi-component dispensing tools may include multiple barrels, e.g., twin barrels, arranged in side-by-side relationship at the forward end of the tool, with each barrel arranged to receive a sausage pack pre-filled with a reactive component to be dispensed. Once the sausage pack is inserted into the front end of the barrel, the front end of the sausage pack is cut open. A common head is arranged to be fitted within the open dispensing end of each barrel. The common head is held in place at the dispensing end of the barrels by any suitable means, such as a swinging retaining plate. The barrels of the multi-component dispensing tool may be of equal length and may be of equal diameter, e.g., two inches, to dispense components in a 1:1 ratio, or may be of different diameters, to dispense the components in unequal ratios. Such multi-component dispensing tools may be air-powered, battery-operated, or manual.

Also, as mentioned above, alternatively, the multi-component dispensing tool may include multiple barrels, e.g., twin barrels, with each barrel arranged to receive a component in bulk form to be dispensed. The barrels may be of equal length and may be of equal diameter to dispense components in a 1:1 ratio, or may be of differing diameters, to dispense the components in unequal ratios.

The common head is often bisected by a central separator web or partition which divides the common head into two equally-sized portions to maintain separation of the first and second reactive components as they pass through the common head and into the mixing chamber (also referred to as a nozzle). Due to the geometry of the common head and placement of the partition therein, the reactive component dispensed from the cartridge tube (or the dispensing tool barrel) having the larger cross-sectional size will pass through the common head at a significantly greater velocity (and pressure) than the reactive component dispensed from the smaller diameter cartridge tube (or dispensing tool barrel). Upon interruption of dispensing, due to the difference in velocity and pressure, for some types of materials, the reactive component discharged from the larger diameter cartridge barrel (or dispensing tool barrel) may backflow into the portion of the common head intended for passage of the reactive component discharged from the smaller diameter cartridge tube (or dispensing tool barrel). Such backflow can result in unintended curing within the common head making further dispensing impossible and resulting in unused component material being wasted.

It is an object of the invention to eliminate this drawback and to afford unimpeded delivery of the first and second reactive components from the cartridge tubes (or dispensing tool barrels) through the common head and into the mixing chamber (or nozzle) for mixing and dispensing.

SUMMARY

A common head is arranged for use in combination with a multi-component dispensing tool. The multi-component dispensing tool may be arranged for dispensing reactive components from a cartridge assembly having side-by-side cartridge tubes prefilled with the reactive component, the tubes being of the same or differing capacities. Alternatively, the multi-component dispensing tool may include multiple barrels, each arranged to receive therein a sausage pack pre-filled with a component to be dispensed. As another alternative, the multi-component dispensing tool may include multiple barrels, each arranged to receive a reactive component in bulk form. The common head includes inlet openings and a rigid walled tube having a partition positioned therein to define larger and smaller pathways to enable passage of the reactive components from the cartridge tubes (or dispensing tool barrels) into and through the common head in a predetermined volumetric ratio and prevent backflow of the reactive components which can lead to unintended curing prior to dispensing. A flexible liner arranged for positioning within one or both pathways of the rigid walled tube is also provided to prevent such backflow and unintended curing prior to dispensing.

BRIEF DESCRIPTION OF THE DRAWINGS

The invention will be described in conjunction with the following drawings in which like reference numerals designate like elements and wherein.

DETAILED DESCRIPTION

Figure 1A:
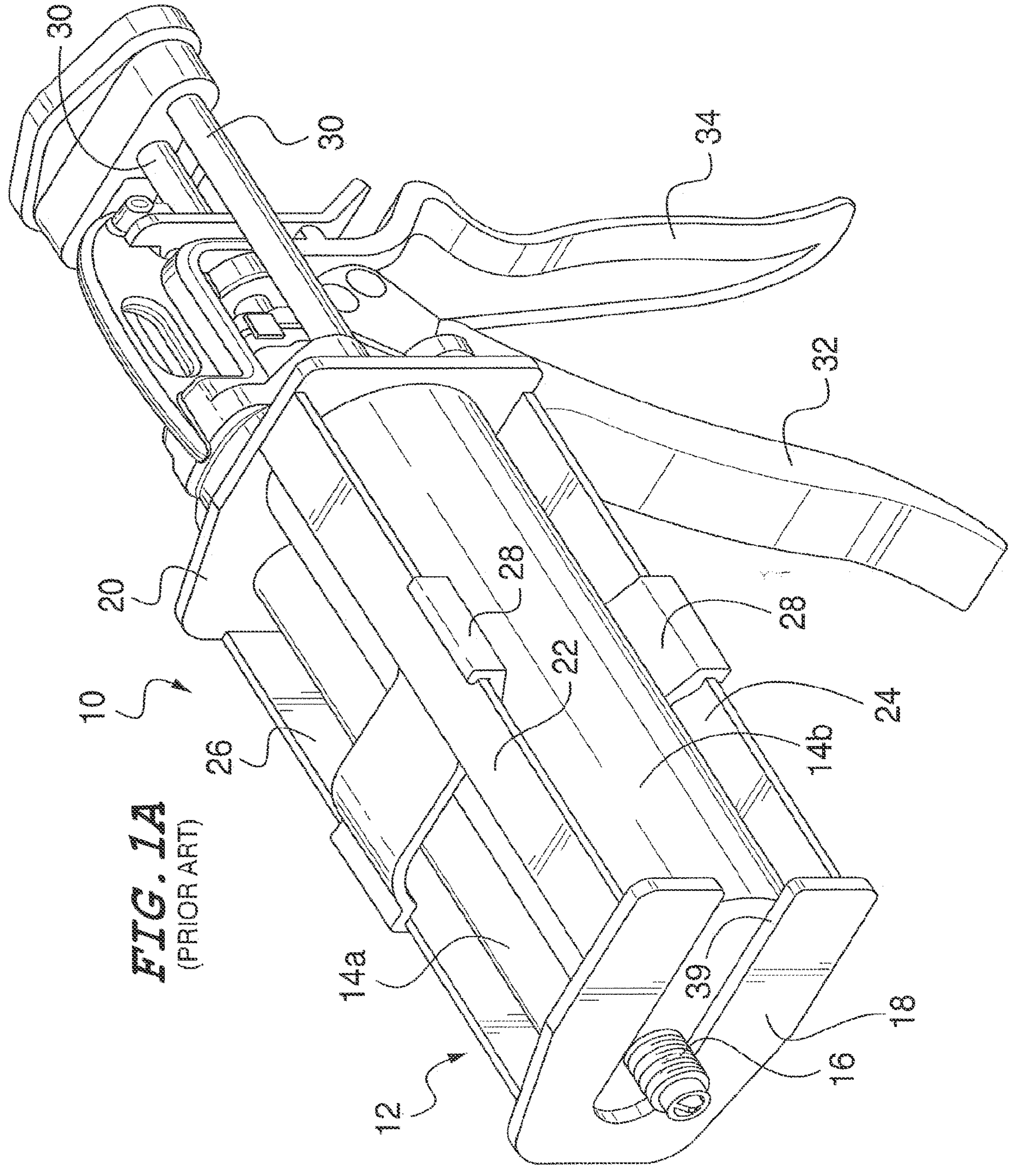
FIG. 1A (PRIOR ART)
FIG. 1A is perspective view of a prior art multi-component dispensing tool that includes a carriage assembly arranged to retain a dual rigid tube cartridge assembly having a common head, with each rigid tube of the cartridge assembly having been preloaded with a reactive component to be mixed upon dispensing.
Figure 1B:
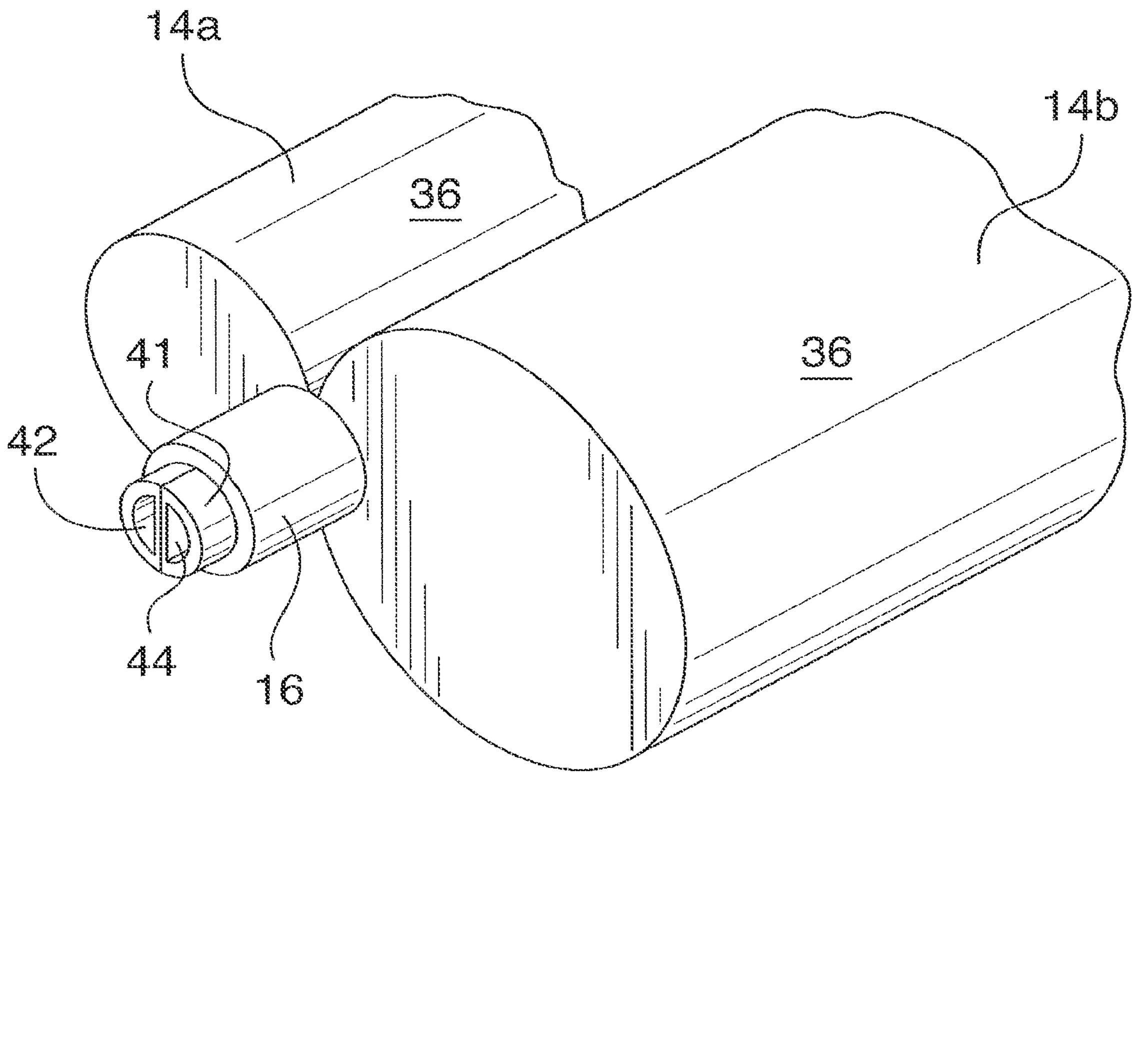
FIG. 1B (PRIOR ART)
FIG. 1B is an enlarged perspective view showing a portion of the prior art dual rigid tube cartridge assembly including a common head.

Referring now to FIGS. 1A and 1B, an explanation of the prior art is provided. As best shown in these figures, a manual multi-component dispensing tool 10 includes a forward section in the form of a material containment unit, or more specifically, a dual component carriage assembly 12 of conventional design for housing a cartridge assembly comprising a plurality, e.g., two, rigid cartridge tubes indicated at 14*a* and 14*b* separately containing reactive components to be dispensed. The carriage assembly 12 is also arranged to guide a plunger (not shown) through each respective cartridge tube 14*a*, 14*b* for discharging the contained reactive components, as needed. The paired rigid cartridge tubes 14*a* and 14*b* may contain different reactive components, individually stable when separate, which when mixed together form a different final composite material. Typically, the cartridge assembly is a one-piece integral construction comprising the two side-by-side cartridge tubes 14*a* and 14*b* that are joined to each other and includes a common head 16 that is part of the integral construction and is common to both rigid cartridge tubes 14*a* and 14*b*. The tubes 14*a* and 14*b* of the cartridge assembly may be formed of any suitable material such as polypropylene or nylon, and may be provided in equal capacities to obtain a 1:1 dispensing ratio, or in unequal capacities to obtain unequal dispensing ratios, e.g., 2:1, 4:1 or 10:1.

The carriage assembly 12 includes a front wall 18 and a rear wall 20, and spaced axial strap members 22, 24 and 26 connected rigidly between these walls, as by welding or bolts (not shown). The front and rear walls 18, 20 and strap members 22, 24 and 26 are separated sufficiently to allow the rigid cartridge tubes 14*a* and 14*b* to be positioned therebetween in side-by-side relationship. Thus, the front and rear walls 18 and 20 are spaced apart by a distance slightly exceeding the length of the rigid cartridge tubes 14*a* and

14*b*, and the two strap members 22, 24 are separated by a distance slightly exceeding the diameter of the larger rigid cartridge tube 14*b* to be held within the carriage assembly 12. Lateral reinforcement straps 28 may be provided to lend stability to the strap members 22, 24, and 26.

Ejectors (not shown in this embodiment) are carried on the distal end of elongated drive rods 30 and are arranged to slide through rear openings (not shown) in each rigid cartridge tube 14*a* and 14*b*. As best shown in FIG. 1A, the elongated drive rods 30 extend forwardly and rearwardly through openings in the rear wall 20. The elongated drive rods 30 and ejectors mounted thereto are driven by manual actuation of a trigger 32 against the handle 34. Alternatively, the drive rods 30 and ejectors may be driven by pneumatic or motorized (battery-powered) actuation (not shown).

As best shown in FIG. 1B, the tubes 14*a* and 14*b* of the cartridge assembly are of a standard size and configuration and comprise a cylindrical body portion 36 for containing the reactive components to be dispensed. Prior to dispensing, a movable plunger (not shown), which may be cup-shaped, is located at the rearward end of the body portion 36. The common head 16 is common to both rigid cartridges 14*a* and 14*b*, and is located at the discharge end of the rigid cartridge tubes. As best shown in FIG. 1A, the common head 16 extends through an open ended slot 39 in the front wall 18. The slot 39 extends from beyond the center of the front wall 18 generally along a plane through the centers of the spaced rigid tubes, 14*a* and 14*b* and/or the elongated drive rods 30.

In operation, with the rigid cartridge tubes 14*a* and 14*b* of the cartridge assembly properly positioned within the carriage assembly 12, the trigger 32 is pulled toward the handle 34 which causes the elongated drive rods 30 and ejectors mounted thereto to move in the forward ejecting direction to come into contact with the moveable plungers situated in the rear portion of the rigid cartridge tubes 14*a* and 14*b*. The ejectors apply force upon the plungers forcing reactive components out through the dispensing common head 16 that is common to both rigid cartridge tubes 14*a* and 14*b* and into a static mixer (not shown) where the reactive components are mixed in an appropriate ratio. As an alternative to manual operation, a pneumatic or cordless (e.g., battery-operated) dispensing gun may be used to dispense the reactive components from the rigid cartridge tubes 14*a* and 14*b*.

As best shown in FIG. 1B, the prior art common head 16 includes a generally circular cross-section, and a discharge opening 41 that is shown as being divided into two generally semi-circular pathways 42 and 44 (FIG. 1B) of equal cross-sectional size and shape. In this manner, the reactive components dispensed from the rigid cartridges 14*a* and 14*b*, respectively, remain separate as they travel through the common head 16. Once the reactive components have passed separately through the common head 16, they may flow into a static mixer (also referred to as a nozzle) (not shown) where the reactive components are blended in the proper ratios. More recently, several manufacturers of materials dispensed from such tools have introduced a snap-together dual cartridge format (not shown) for dispensing two-component (2K) materials such as foams, coatings, potting compounds, and other adhesives and sealants. One such manufacturer which has introduced this new format is Nordson EFD of East Providence, Rhode Island which offers this snap-together format under the trademark Ratio-Pak®. See, e.g., https://www.nordson.com/en/divisions/efd/products/syringe-barrels-and-cartridges/ratio-pak-snap-together-cartridges. Another manufacturer of this snap-together style is Sulzer. Under this format, side-by-side rigid cartridges are provided in a variety of sizes and have the ability to snap together to combine multiple ratios. The snap-together format allows end users to choose any ratio that their material may require, all the way up to 25:1. The snap-together format is designed to be compatible with the carriage assemblies of dispensing tools arranged to receive dual tube cartridges of one-piece integral construction, as discussed above. The snap-together format is designed to work with a number of static mixers for two-component materials with high to low viscosities. Once the cartridges are snapped together, a common head is formed of two half-moon shaped portions on each cartridge coming together.

Figure 2A:
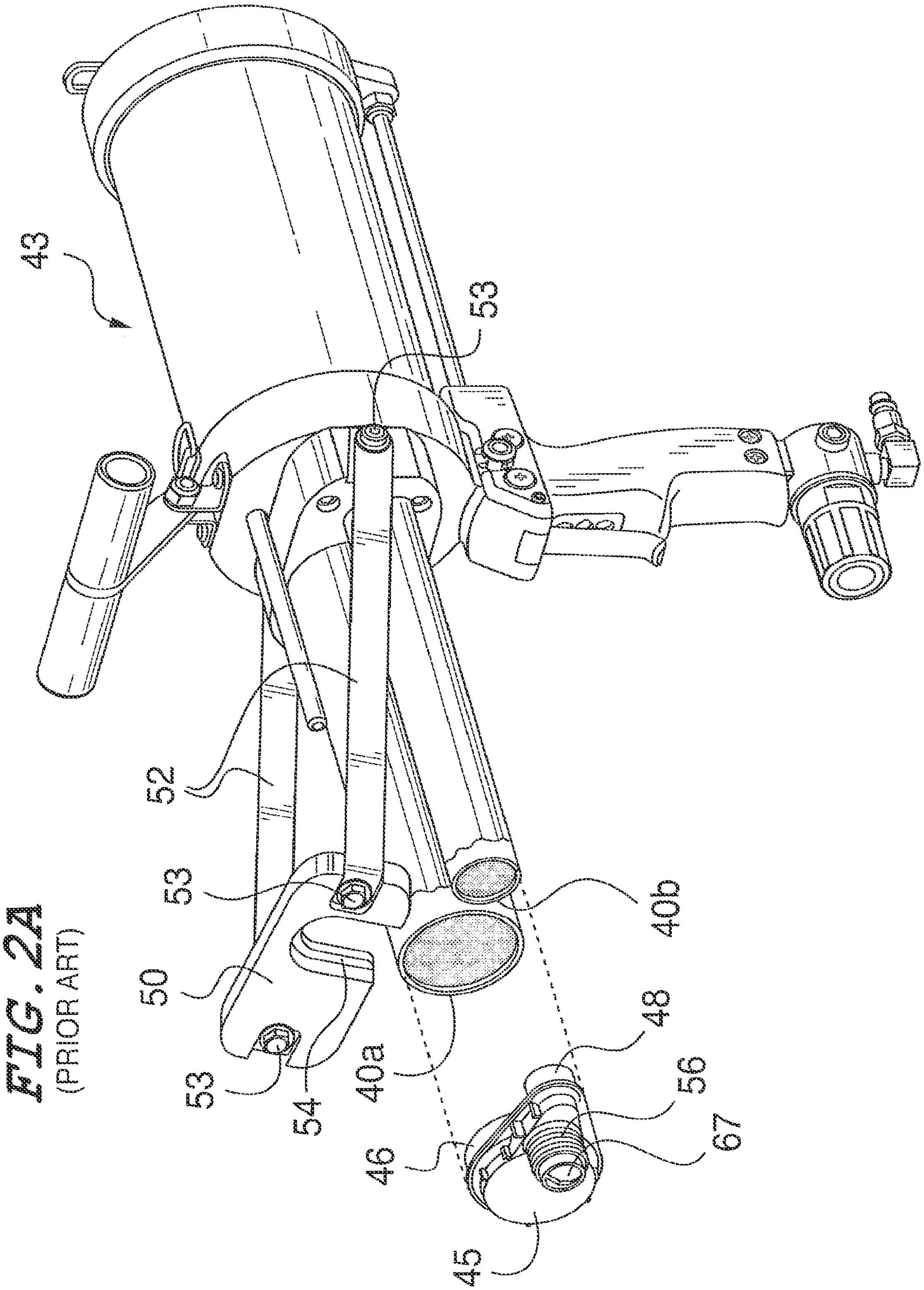
FIG. 2A (PRIOR ART)
FIG. 2A is a perspective view of a prior art pneumatic multi-component dispensing tool including a pair of side-by-side barrels, each barrel arranged to receive a sausage preloaded with a reactive component; or, alternatively, each barrel arranged to receive a reactive component in bulk form.
Figure 2B:
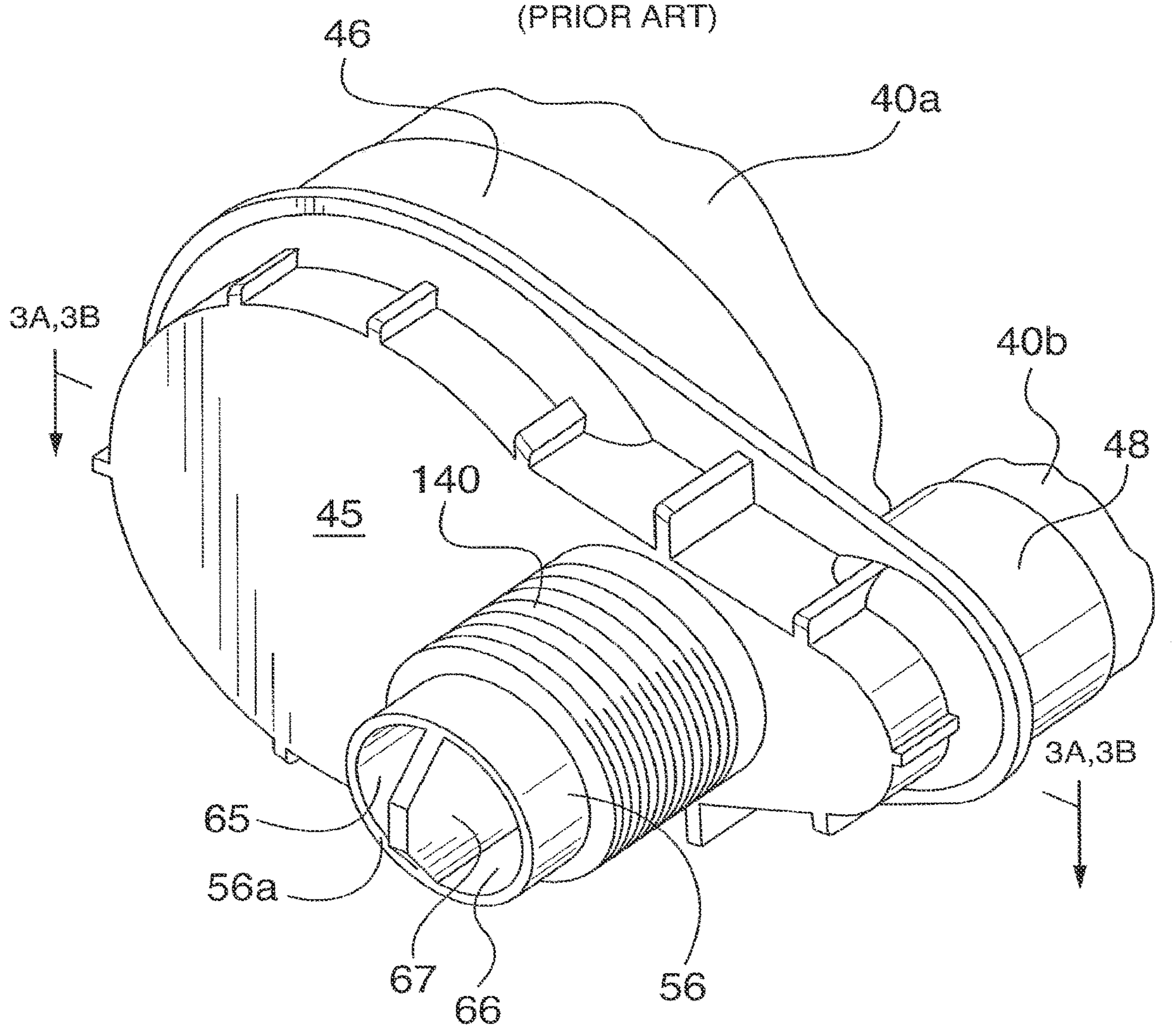
FIG. 2B (PRIOR ART)
FIG. 2B is an enlarged perspective view of the prior art manifold including a common head affixed to the pair of side-by-side barrels arranged to receive a preloaded sausage or a reactive component in bulk form.

Continuing the explanation of the prior art and referring now to FIGS. 2A and 2B, under an alternative prior art embodiment, the reactive components may be provided in the form of pre-loaded sausages (not shown) arranged to be loaded within the side-by-side barrels 40*a* and 40*b* of a multi-component dispensing tool 43 for discharging reactive components from sausages. The barrels 40*a* and 40*b* may be twin barrels arranged in side-by-side relationship at the forward end of the pneumatic dispensing tool 43, with each barrel 40*a* and 40*b* arranged to receive a sausage pack (not shown) pre-filled with a reactive component to be dispensed. The barrels 40*a* and 40*b* may be of equal length and may be of equal diameter, e.g., two inches, to dispense components in a 1:1 ratio, or, as shown, may be of different diameters, to dispense the components in unequal ratios. Although the tool 43 is shown as being pneumatic or air-powered, the tool 43 could be battery-operated, or manual. Once the sausage pack (not shown) is inserted into the front end of the barrel, the front end of the sausage pack is cut open for dispensing of the reactive component housed therein. A prior art manifold 45 is arranged for locating at the forward discharge end of the barrels 40*a* and 40*b*. As shown in FIGS. 2A and 2B, the manifold 45 includes an inlet end comprised of two cylindrical-shaped inlet caps, 46 and 48, the inlet caps being adjacent to one another and of differing diameters. One inlet cap 46, shown as being larger in diameter, is arranged to cover over the discharge end of the barrel 40*a* having larger cross-sectional size. The other inlet cap 48 is smaller in cross-sectional size and is arranged to cover over the discharge end of the barrel 40*b* of smaller cross-sectional size. Alternatively, the caps could be sized for insertion into the open ends of barrels 40*a* and 40*b*.

The prior art manifold 45 may be retained in place against the dispensing end of the barrels 40*a* and 40*b* by any suitable means, such as by utilizing a retaining plate 50. A pair of elongate arms 52 is provided, the distal ends of which attach to the retaining plate 50 using any suitable hardware, e.g., nuts and bolts 53. At the proximal end, each arm 52 attaches at a suitable location on the dispensing tool 43, also using any suitable hardware, e.g., nuts and bolts 53. The arms 52 are arranged to enable the retaining plate 50 to be moved manually between a retaining position (not shown) and maintenance position (FIG. 2A). In the retaining position, the retaining plate 50 is disposed over the manifold 45 when the manifold 45 is positioned at the discharge end of the barrels 40*a* and 40*b* during dispensing. The retaining plate 50 is provided with a cut-out section 54 to permit a common head 56 disposed on the manifold 45 to extend therethrough when the retaining plate 50 is in the retaining position over the manifold 45. Once reactive components have been dispensed from the sausages, the retaining plate 50 may be swung from the retaining position to the maintenance position (FIG. 2A) to enable removal of the manifold 45 from the discharge end of the barrels 40_a_ and 40_b_ and for removal of the empty sausage casings located within the barrels 40_a_ and 40_b_.

Figure 3A:
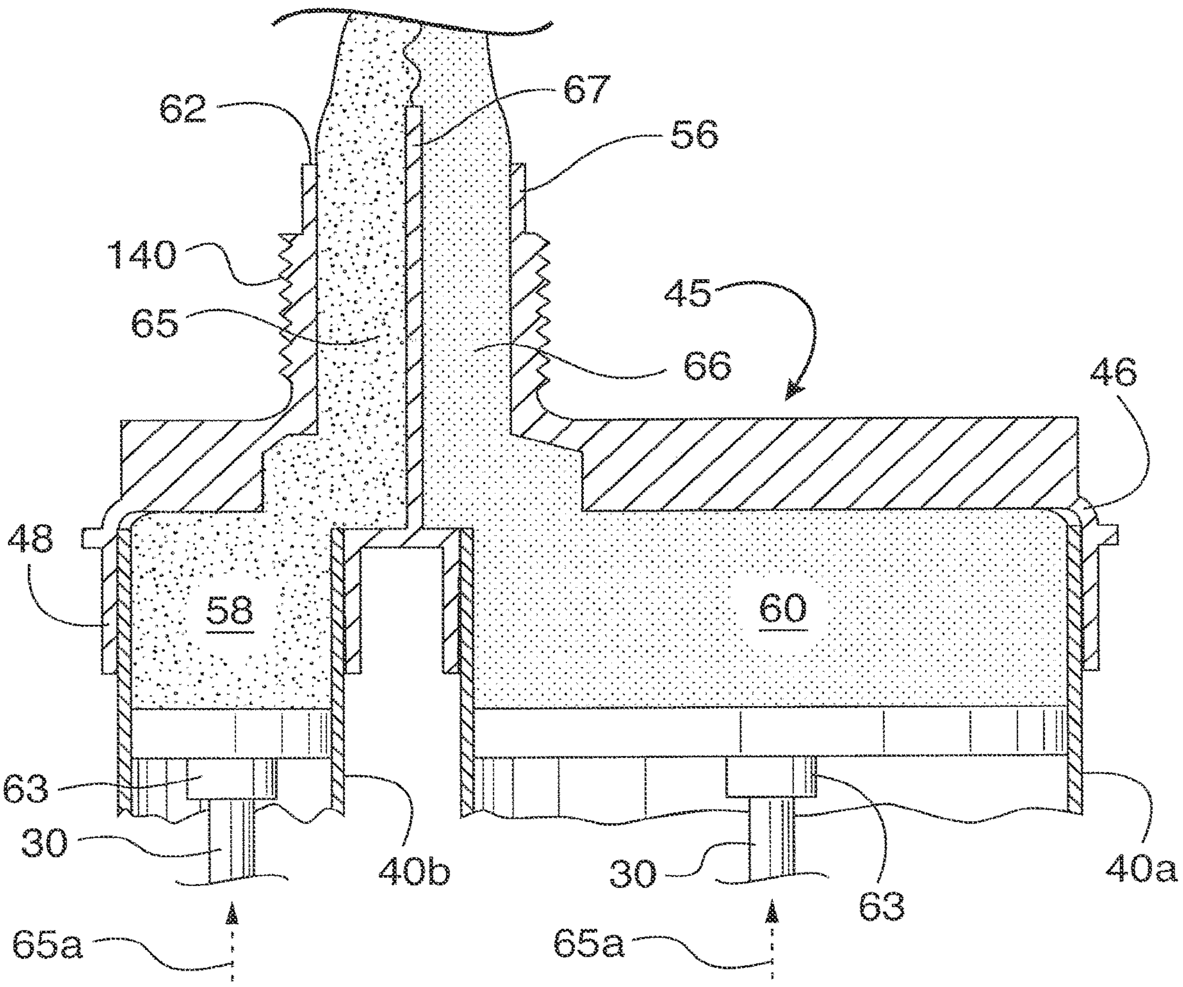
FIG. 3A (PRIOR ART)
FIG. 3A is a sectional view taken along lines 3A-3A of FIG. 2B.

Referring now to FIGS. 2A, 2B and 3A, during actuation of the dispensing tool 43, the reactive components 60 and 58 flow through the dispensing end of the barrels 40_a_ and 40_b_, respectively, and into the manifold 45 through the respective inlet caps 46, 48 and into a common head 56 extending from the inlet end of the manifold 45. Similar to the prior art common head 16, described above, the prior art common head 56 includes a length, a generally circular cross-section, and a discharge opening 62. The prior art common head 56 includes an external thread 140 to enable threaded attachment to a mixing chamber (not shown) thereover. For example, the mixing chamber (also referred to as a nozzle) may be a static mixing chamber. The prior art common head 56 is divided into two pathways 65, 66 (FIG. 3A) of equal cross-sectional size by means of a divider or partition 67 bisecting the common head 56. In this manner, the reactive components 60, 58 dispensed from the barrels 40_a_ and 40_b_ remain separate as they travel through the common head 56. Once the reactive components 58, 60 have passed separately through the common head 56, they flow into a static mixer (not shown) where the reactive components 58 and 60 are blended in the proper ratios.

Referring now to FIG. 3A, during dispensing, the ejectors 63 apply equal force in the direction of arrows 65_a_ to the sausages containing the reactive components 60 and 58 housed within the barrels 40_a_ and 40_b_ and move at the same speed. Due to the geometry of the common head 56, i.e., two pathways 65, 66 of equal cross-sectional size, the reactive component 60 dispensed from the larger diameter barrel 40_a_ will pass through the pathway 66 of the common head 56 at a significantly greater velocity (and pressure) than reactive component 58 dispensed from the smaller diameter barrel 40_b_ through pathway 65. For example, reactive component 58 may pass through the common head 56 at one-tenth the velocity of reactive component 60 due to the difference in volume. The same difference in flow velocity of the reactive components exists in the prior art common head 16 described above.

Figure 3B:
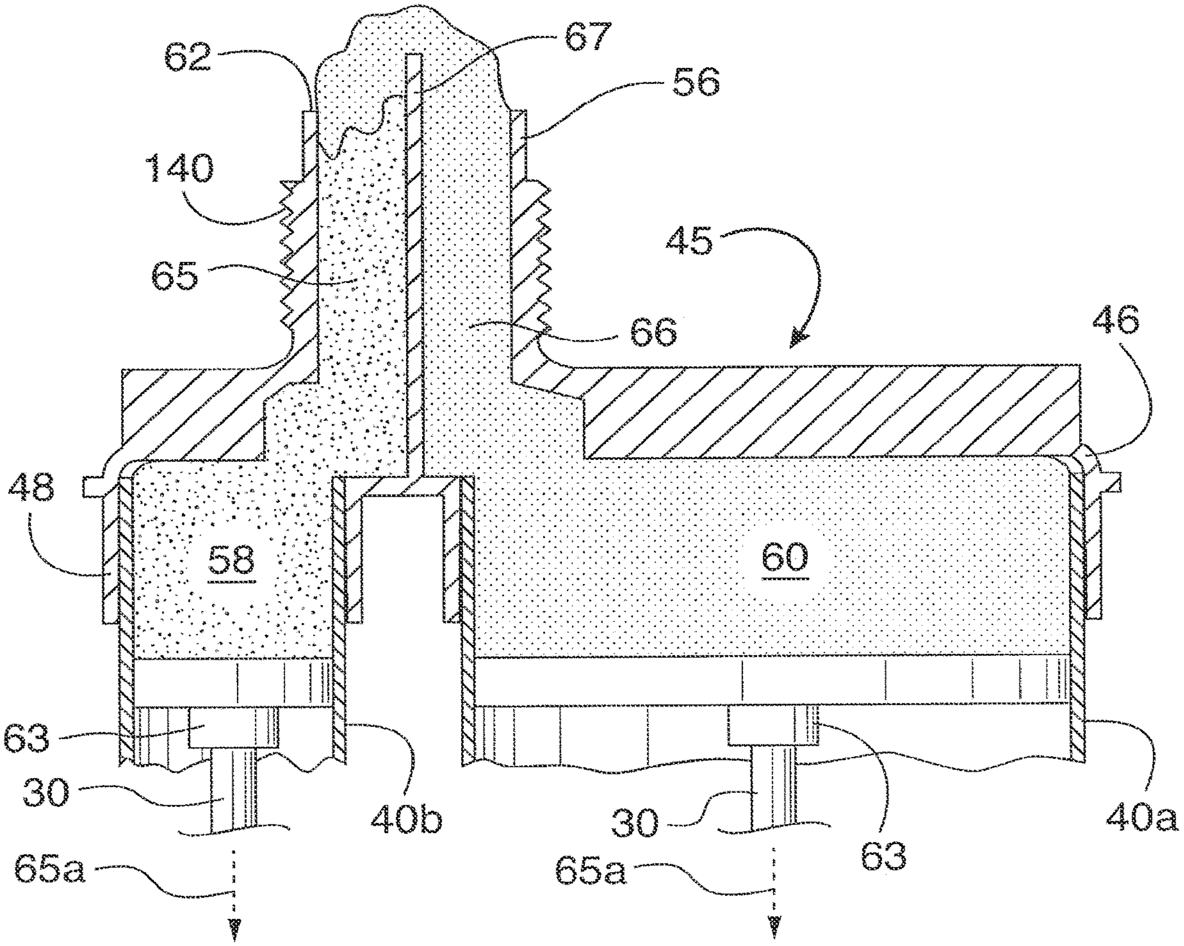
FIG. 3B (PRIOR ART)
FIG. 3B is a sectional view taken along lines 3B-3B of FIG. 2B illustrating the backflow disadvantage of the prior art manifold including a common head.

Referring now to FIG. 3B, when dispensing has been stopped or is interrupted (as indicated by arrows 65_a_ (FIG. 3B), for some types of materials, the component being discharged at a greater velocity, i.e., reactive component 60, may backflow into the pathway of the other component, i.e., reactive component 58, causing unintentional mixing of the components and curing within the common head 56 and clogging which can result in making further dispensing impossible and resulting in unused reactive components remaining in the barrels 40_a_ and 40_b_. Based upon its substantially similar geometry, this same backflow and clogging problem exists with the prior art common head 16 described above.

Figure 4:
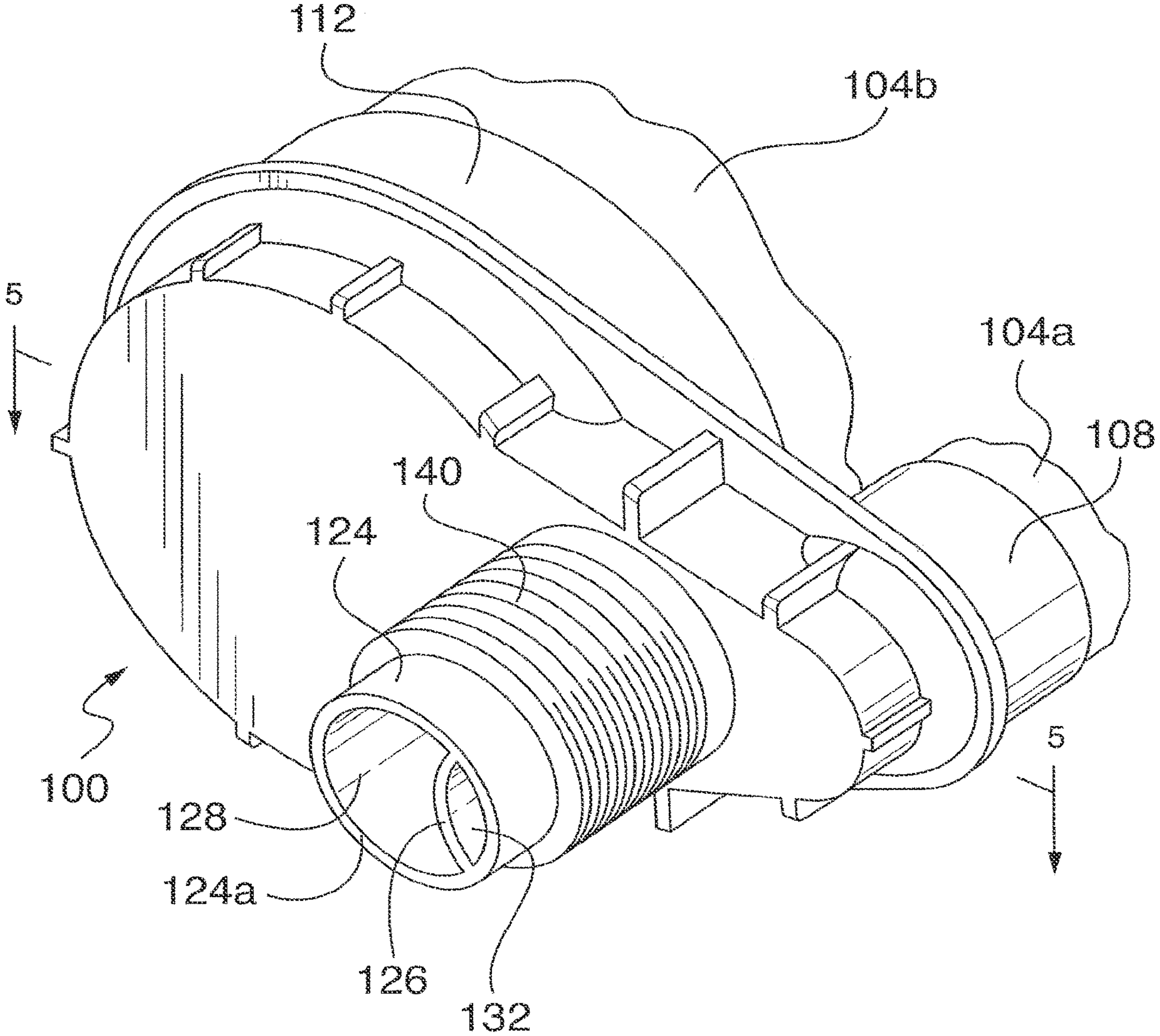
FIG. 4 is a perspective view of the manifold including a common head of the present invention including an offset partition shown in combination with a dual cartridge assembly.
Figure 5:
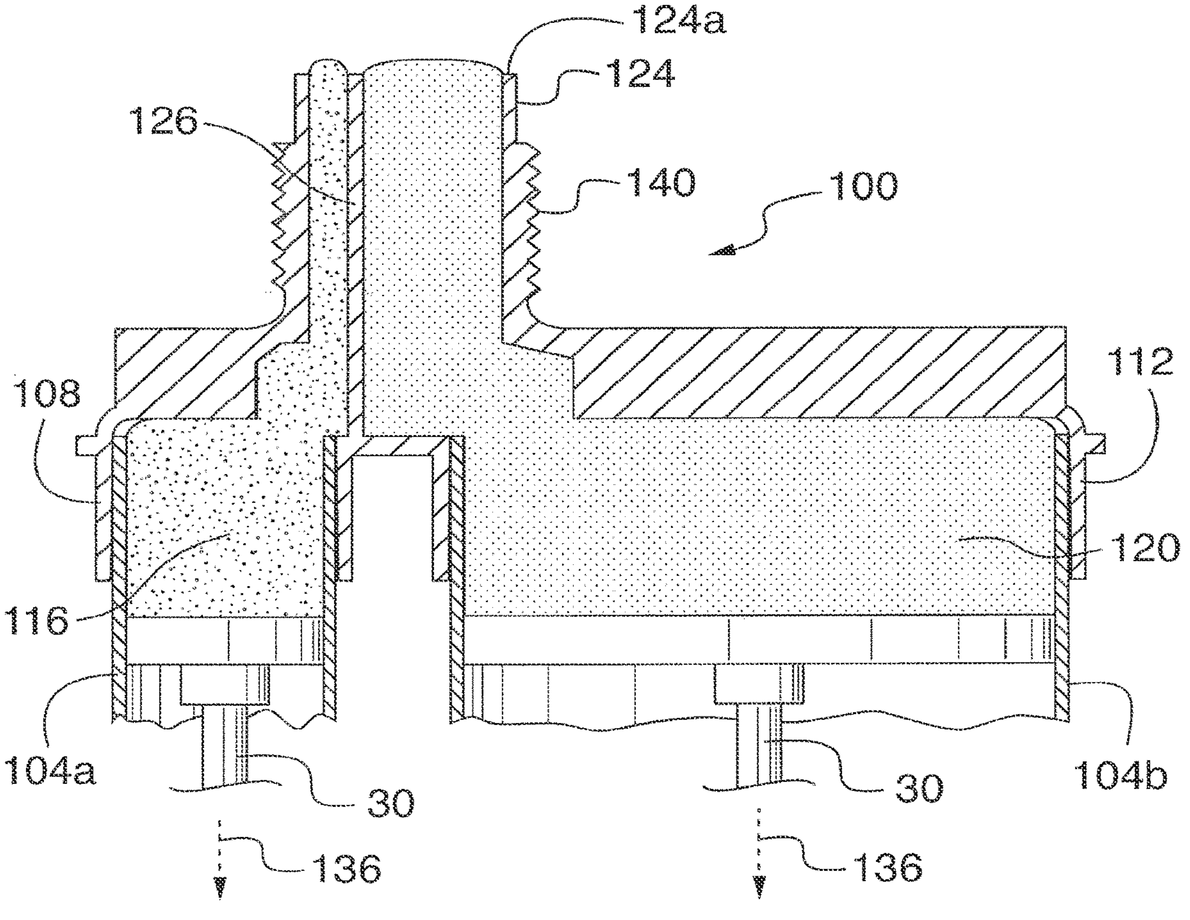
FIG. 5 is a sectional view taken along lines 5-5 of FIG. 4.
Figure 6:
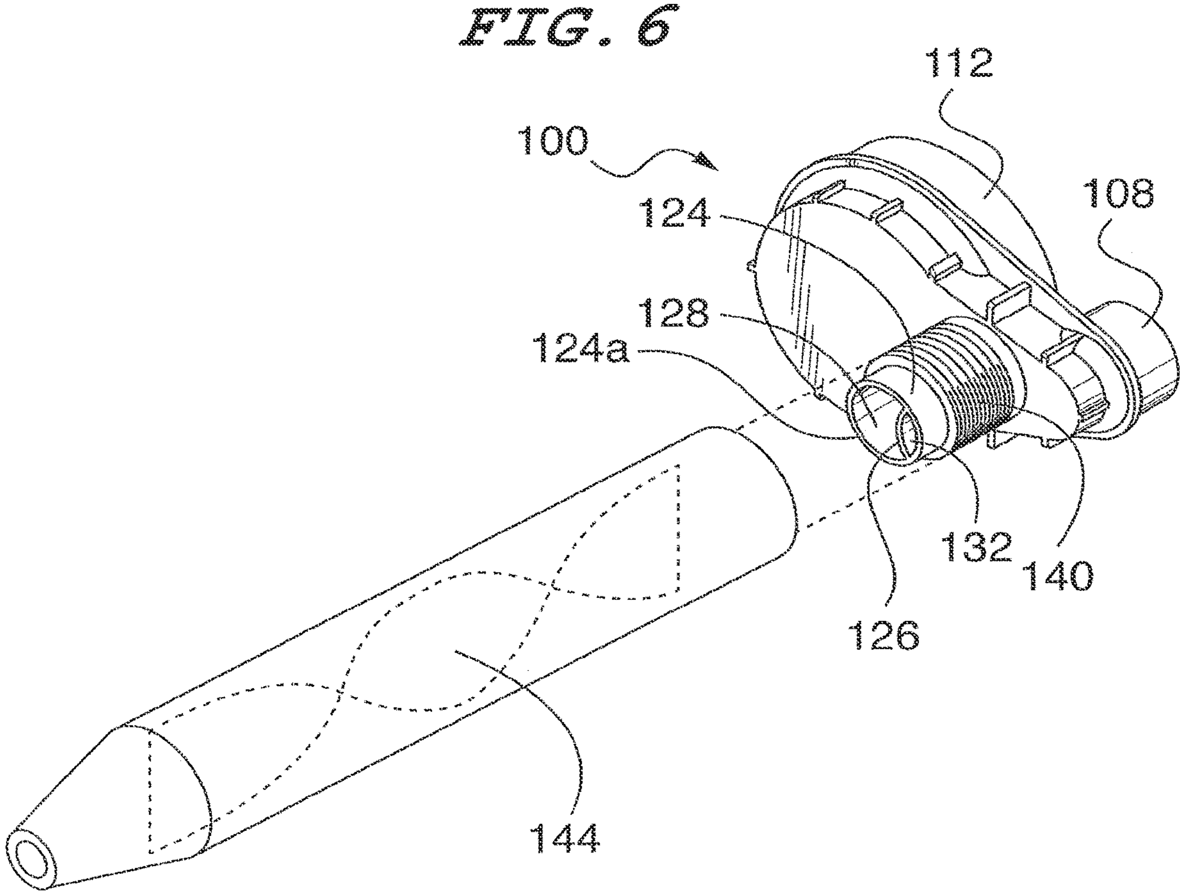
FIG. 6 is a perspective view of the manifold including a common head of the present invention including the offset partition with a static mixer arranged for attachment to the inventive common head.

Referring now to FIGS. 4-6, the manifold 100 of the present invention is illustrated. As shown in these figures, the manifold 100 is arranged for locating at the forward discharge end of barrels 104_a_ and 104_b_ of a multi-component dispensing tool wherein the barrels contain sausages that have been preloaded with reactive components to be dispensed, as previously described. The manifold 100 may be formed of any suitable material, e.g., injection molded plastic. The barrels 104_a_, 104_b_ may be of different capacities, e.g., 300×150 ml, and may have equal lengths, but unequal cross-sectional sizes. Alternatively, as discussed previously, the manifold 100 may be part of a cartridge assembly that is of one-piece construction comprising two side-by-side cartridge tubes that are joined to each other, the common head being in communication with both cartridge tubes. The barrels 104_a_ and 104_b_ may be intended for containing reactive materials, e.g., epoxy resin and a hardener, which must remain out of contact with each other within the dispenser so that when mixed they chemically react to form a final product. As shown in these figures, the manifold 100 includes an inlet end comprised of two cylindrically-shaped inlet caps 108, 112, the inlet caps being of differing diameters. One inlet cap 112 is larger in diameter and arranged to cover the discharge end of the barrel 104_b_ having the larger capacity. The other inlet cap 108 is smaller in diameter and arranged to cover the discharge end of smaller diameter barrel 104_a_ having the smaller capacity.

During actuation of the dispensing tool 100, the drive rods 30 (FIG. 5) of the dispensing gun move forward and contact the pre-loaded sausages containing the reactive components housed within the barrels 104_a_ and 104_b_ to force the reactive components 116 and 120 from the barrels 104_a_ and 104_b_, respectively, and into the inlet end of the manifold 100 through the inlet caps 108, 112. The actuation system could be manual, hydraulic, pneumatic or another type for simultaneously dispensing the reactive components 116, 120 from the barrels 104_a_, 104_b_, respectively.

Thereafter, the reactive components 116, 120 flow into a common head 124 having a length, a circular cross-section and a discharge opening 124_a_. As best shown in these figures, the common head 124 includes an offset partition 126 which is located at a position that is offset from the center of the tube 124 and extends substantially the entire length of the common head 124. The offset partition 126 may extend beyond the discharge opening 124_a_ of the common head 124. As best shown in FIG. 4, the offset partition 126 may include a curved profile along its length. As best shown in FIG. 4, the offset partition 126 divides the common head 124 into two pathways, i.e., a larger pathway 128 having a larger cross-sectional size for passage of a larger volume of reactive component 120 from the larger capacity barrel 104_b_ and a smaller pathway 132 having a smaller cross-sectional size for passage of a comparatively smaller volume of reactive component 116 from the smaller capacity barrel 104_a_. Due to the presence of the offset partition 126, the reactive components 116 and 120 remain separate as they flow through the common head 124 and may be discharged from the common head 124 in a predetermined fixed ratio into a mixing chamber (nozzle) 144 (FIG. 6) located downstream which mixes the reactive components 116 and 120 just prior to dispensing.

By adjusting the location of the offset partition 126 within the common head 124, the cross-sectional size of the pathways 128, 132 may be adjusted relative to each other. In this manner the velocity of the reactive components 116, 120 discharged through pathways 128, 132 may be adjusted to be roughly equal to each other. Referring now to FIG. 5, prior to interruption of dispensing, both reactive components 116 and 120 exit the discharge tube 124 at approximately the same velocity (and pressure). Therefore, upon interruption of dispensing, as indicated by arrows 136, the tendency for backflow and unintended curing is substantially reduced. Likewise, the reactive components 116, 120 are dispensed in a preset, accurately controlled relationship to ensure that the chemical reaction takes place when forming the final product, not within the common head 124.

As best shown in FIGS. 4-6, the common head 124 of the inventive manifold 100 is provided with an external thread 140 to enable threaded attachment of a mixing chamber (or nozzle) 144, e.g., a static mixing chamber (FIG. 6), thereover. The separate reactive components 116, 120 are discharged from the common head 124 and into the mixing chamber (or nozzle) 144 where they are mixed in an appropriate ratio and dispensed.

The manifold 100 of the present invention has been described as arranged for locating at the forward discharge end of a multi-component dispensing tools including multiple barrels, e.g., twin barrels, arranged in side-by-side relationship at the forward end of the tool, with each barrel arranged to receive a sausage pack pre-filled with a reactive component to be dispensed, or with each barrel arranged to receive a reactive component in bulk form. However, it should be understood this is exemplary only and provided for the purpose of explaining the functionality of the manifold 100. The manifold 100 of the present invention may also be used in combination with a cartridge assembly comprising two side-by-side cartridge tubes that are joined to each other wherein the common head is integral with the cartridge tubes, as discussed above in connection with FIGS. 1A and 1B. In addition, the inventive manifold 100 including the common head 124 may be utilized in combination with the snap-together cartridge format discussed above.

Also, manufacturers have recently introduced a film-based two-component cartridge assembly that allows the cartridge to compress into a manifold as fluids are dispensed. The format supports sustainability initiatives by reducing waste and disposal costs and carbon footprint when compared with conventional rigid cartridge assemblies, such as those described above. One such manufacturer which has introduced this new format is Nordson EFD of East Providence, Rhode Island which offers the format under the trademark Film-Pak®. See, e.g., https://www.nordson.com/en/divisions/efd/products/two-component-2k-products-mixers/film-pak-cartridge-systems.

Figure 7:
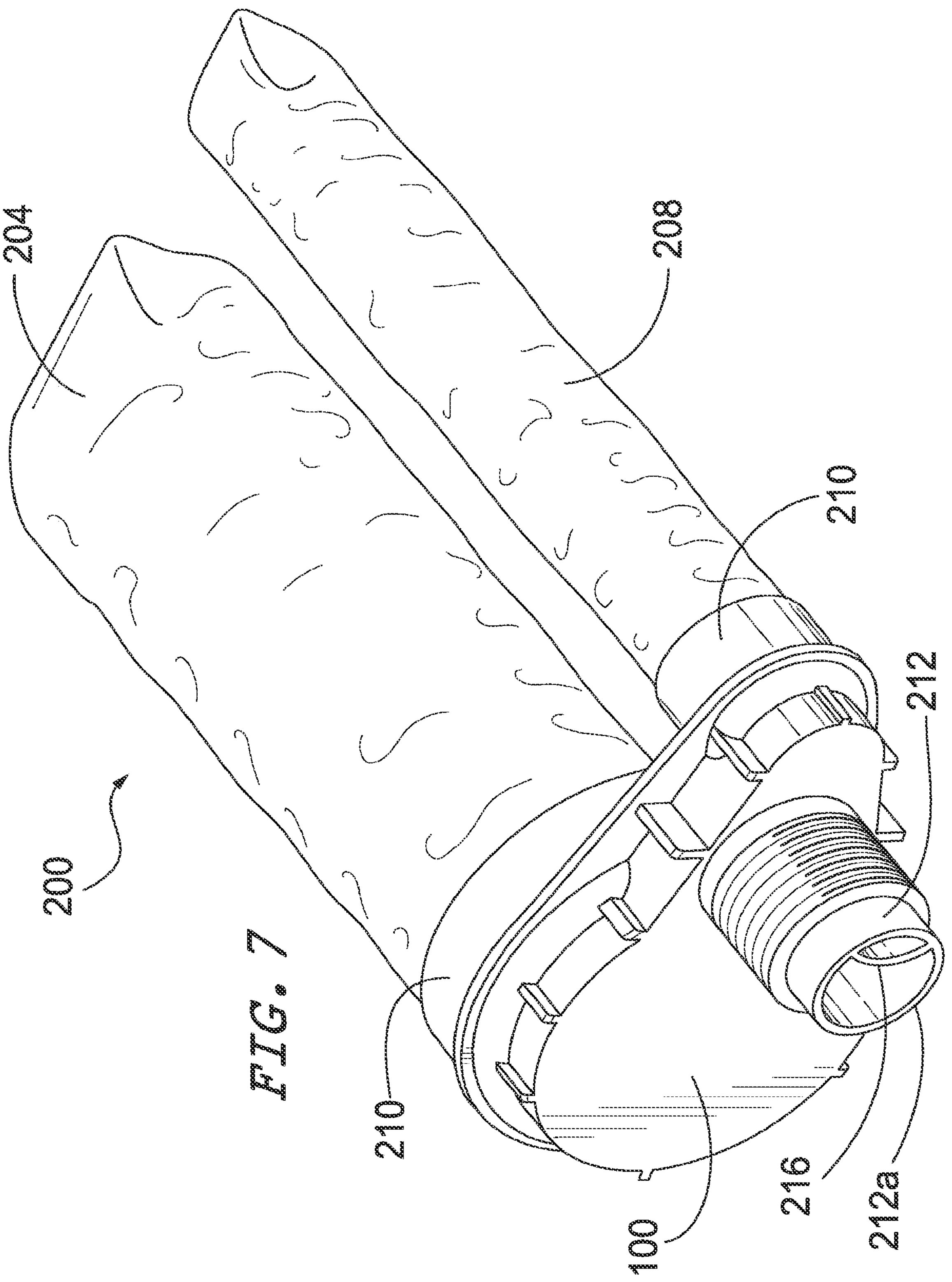
FIG. 7 is a perspective view of the inventive manifold having a common head implemented as part of a system for dispensing multi-component fluids from side-by-side compressible film packages.
Figure 8:
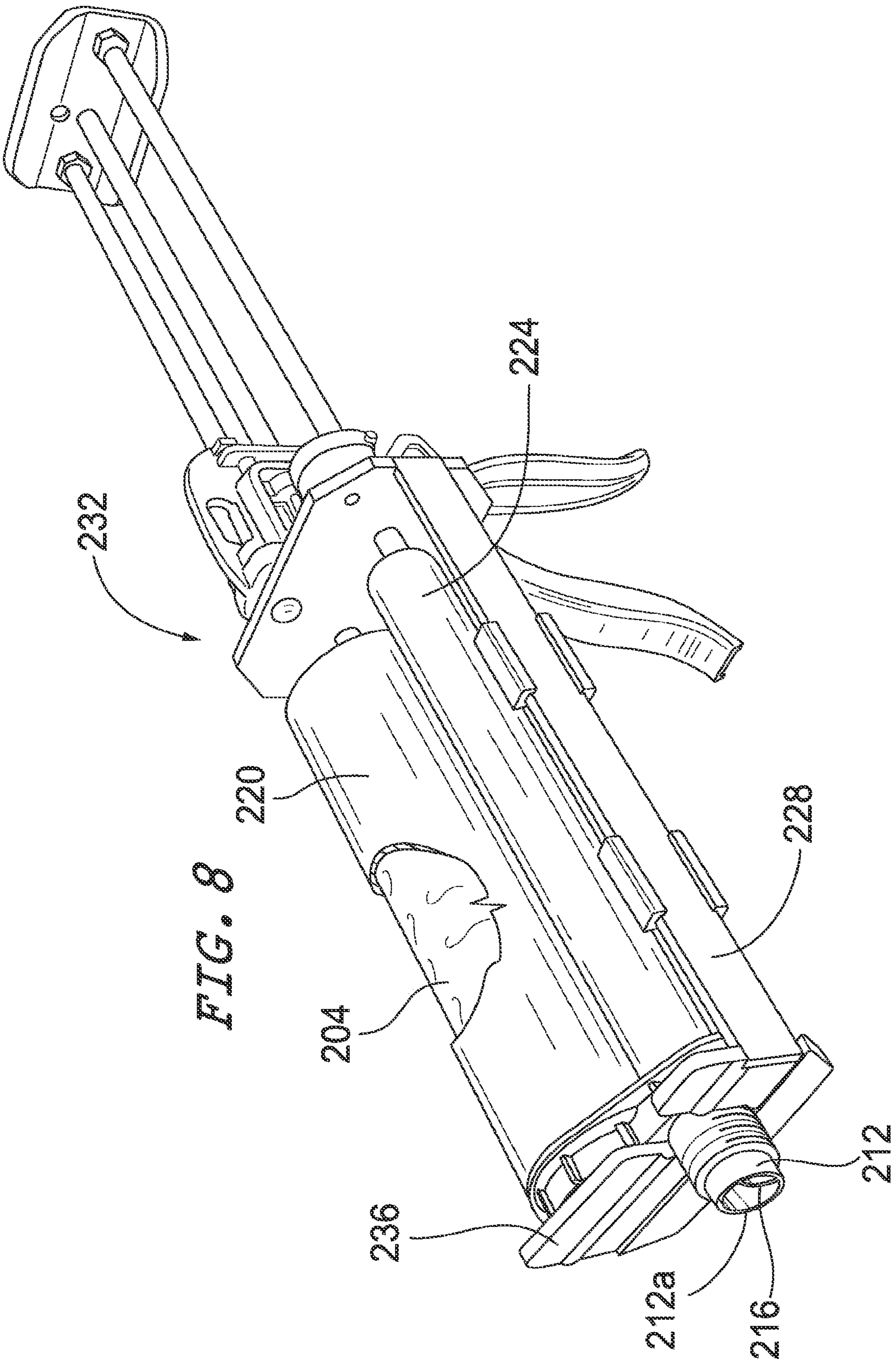
FIG. 8 is a perspective view of the inventive embodiment of FIG. 7, with the film packages housed within rigid sleeves retained within a carriage assembly of a dispensing device.

Referring now to FIGS. 7 and 8, there is illustrated in these figures the manifold 100 of the present invention implemented as part of the film-based format discussed above. As shown in the figures, an assembly 200 is provided for dispensing multi-component fluids from side-by-side compressible film packages 204 and 208. The paired compressible film packages 204 and 208 are bonded inlet caps 210 located on the manifold 100 to prevent leakage. Each film package 204 and 208 may contain a different reactive component, individually stable when separate, which when mixed together form a different final composite material. Typically, the assembly 200 is an integral construction comprising the two side-by-side film packages 204 and 208 that are joined to a common head 212. Both compressible film packages 204 and 208 may be formed of any suitable film material. Each film package may be single-layer or multi-layer. The compressible film packages 204 and 208 may be provided in equal capacities to obtain a 1:1 dispensing ratio, or in unequal capacities to obtain unequal dispensing ratios, e.g., 2:1, 4:1 or 10:1.

As discussed in previous embodiments, during dispensing, the reactive components contained within the film packages 204 and 208 flow into the common head 212 having a length, a circular cross-section and a discharge opening 212*a*. As best shown in these figures, the common head 212 includes an offset partition 216 which is located at a position that is offset from the center of the discharge opening 212*a* and similar to the prior embodiments extends substantially the entire length of the common head 212. The offset partition 216 may extend beyond the discharge opening 212*a* of the common head 212. As best shown in FIG. 7, the offset partition 216 may include a curved profile along its length. As described in previous embodiments, the offset partition 216 divides the common head 212 into larger and smaller separated pathways for passage of differing volumes of reactive components in a predetermined fixed ratio into a mixing chamber.

As best shown in FIG. 8, the compressible film packages of the assembly 200 are arranged to be housed within rigid tubes 220 and 224, the rigid tubes being arranged for placement within the carriage assembly 228 of a conventional dual component dispensing tool 232, with the common head 212 of the assembly 200 extending through an opening in the front wall 236 of the tool 232. During operation, in response to actuation of the trigger 234, ejectors carried on elongated drive rods (not shown) of the tool 232 advance within the rigid tubes 220 and 224 to compress the respective film packages 204 and 208 to discharge the reactive components therein. At the end of discharging, the film packages are fully compressed into the manifold, and the assembly 200 may be discarded. The assembly 200 is environmentally friendly, because upon being fully compressed, the film packages occupy substantially less space than conventional cartridge assemblies that have been fully discharged.

Figure 9:
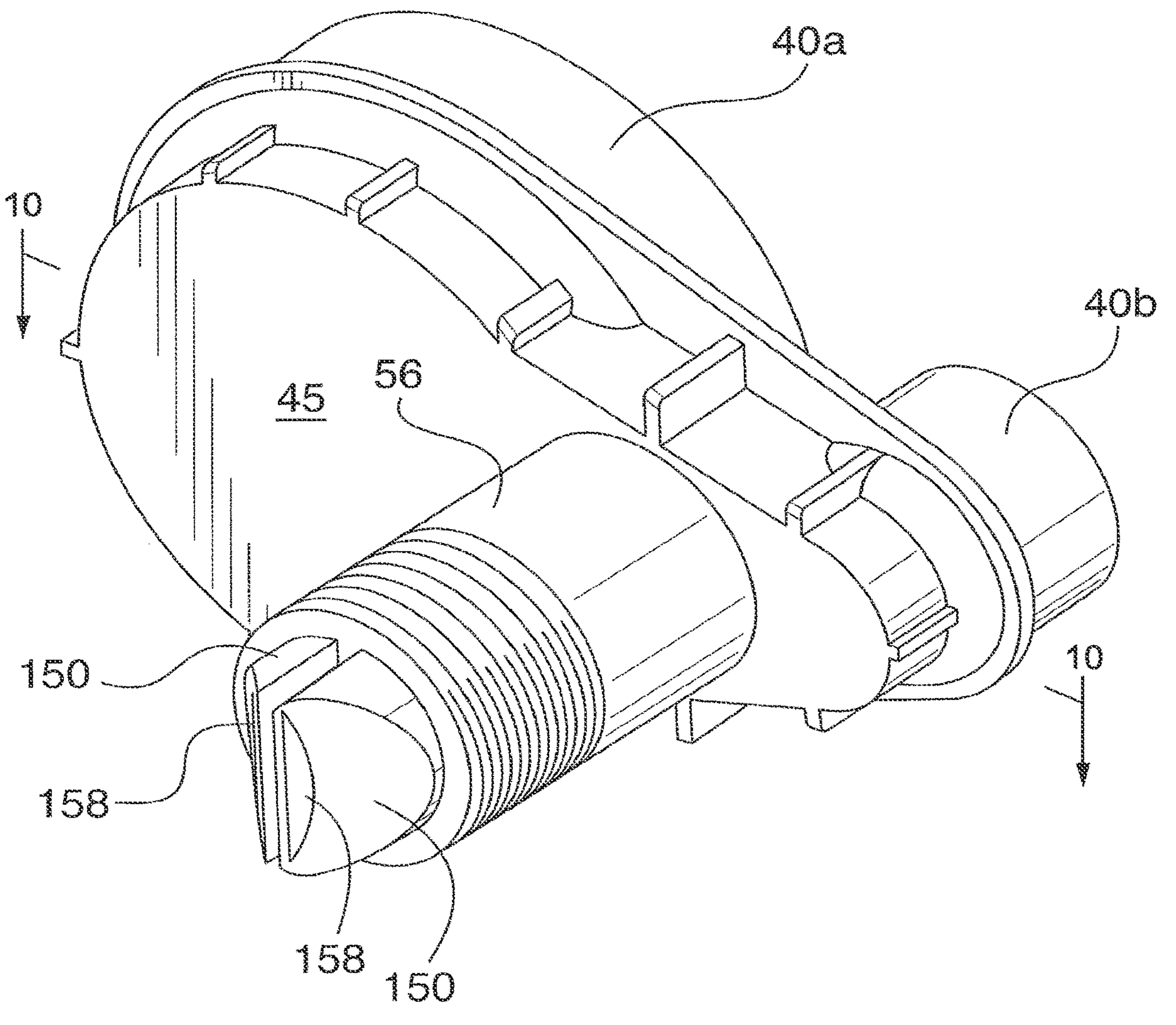
FIG. 9 is a perspective view of liners of the present invention inserted within the pathways of a common head of a manifold of the prior art dual cartridge assembly.
Figure 10:
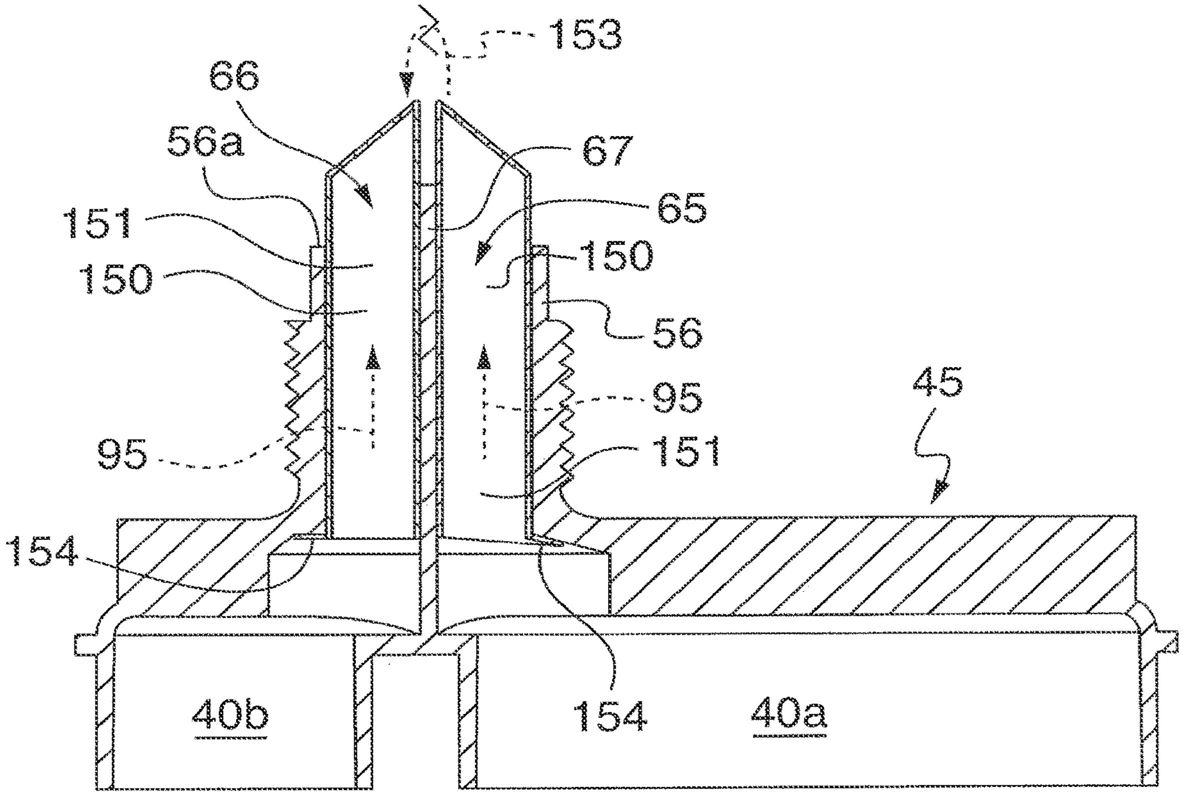
FIG. 10 is a sectional view taken along lines 10-10 of FIG. 9.

Referring now to FIGS. 9 and 10, the manifold 45 of the prior art is disclosed in combination with an inventive flexible liner 150 disposed within each pathway 65, 66 of the common head 56 to prevent backflow and unintended curing of flowable materials (not shown) during dispensing. As previously described, due to the geometry of the manifold 45 and unequal size of the barrels, the reactive component (not shown) dispensed from the larger diameter barrel 40*a* will pass through the common head 56 at a greater velocity than the other reactive component (not shown) dispensed from the smaller diameter barrel 40*b*, and upon interruption in dispensing, this difference in velocity may result in backflow causing unintended curing before the materials have been dispensed.

As an alternative mechanism to address the backflow problem, the flexible liners 150 are provided. The flexible liners 150 are disposed within each of the two pathways 65, 66 of the prior art manifold 45. As best shown in FIG. 10, the flexible liners 150 include a flange portion 154 enabling attachment of the flexible liners 150 within the pathways 66 of the manifold 45. Specifically, the flange portion 154 may be attached to the interior surface of the manifold 45 by any suitable means, e.g., epoxy glue. Each flexible liner 150 includes a tubular portion 151 that extends from the flange portion 154 through the length of the pathway 65, 66 in which the liner is disposed. As the pathways of the prior art manifold 45 are of equal cross-sectional size, the tubular portion 151 of the flexible liners 150 are roughly equal to each other in cross-sectional size and are sized to fit snugly within their respective pathways 65, 66. Alternatively, the cross-sectional sizes may be unequal. The tubular portions 151 are arranged to move between an expanded position (FIG. 10) during dispensing in response to positive pressure from the reactive components traveling therethrough, and a collapsed position (FIG. 9, flexible liner 150 on left-hand side) during interruption of dispensing. In the expanded position (FIG. 10), the tubular portion 151 abuts the inside wall of the common head 56 to permit a reactive component to pass therethrough in the dispensing direction as indicted by arrows 95. When dispensing is interrupted, the tubular portions 151 move from the expanded position to a collapsed position whereupon the tubular portion 151 collapses upon itself similar to an uninflated balloon to prohibit any backflow of a higher velocity reactive component 65 into the pathway 66 of the lower velocity component as indicated by arrow 153 (FIG. 10). The flexible liner shown on the left-hand side in FIG. 9 illustrates the collapsed position.

The tubular portion 151 may extend beyond the discharge opening 56*a* of the common head 56 and terminates at a slitted opening 158 (FIG. 9) which acts as a one-way valve arranged to move between an open position when the tubular portion is in the expanded position to allow the passage of a reactive component through the liner 150 in the dispensing direction of arrow 95 and a biased normally closed position during interruption in dispensing and the tubular portion 151 is in the collapsed position to prohibit any backflow of any reactive components such as in the direction of arrow 153 (FIG. 10). In FIG. 9, the left-hand liner 150 is shown in the closed position and the right-hand liner 150 is shown in the open position.

Although not illustrated in FIGS. 9 and 10, as an alternative embodiment, a flexible liner 150 may be situated within one of the two pathways 65, 66, e.g., within the pathway of the lower velocity reactive component only, as opposed to being situated in both pathways. The flexible liner 150 may be formed of any suitable thin sheet material, e.g., a synthetic or natural rubber, or any elastomer or other material that is capable of moving between the collapsed and expanded positions described above. The inventive flexible liner 150 may be employed in a similar manner with the prior art common head 16 described above and disclosed in FIGS. 1A and 1B, the common head being integral with side-by-side cartridge tubes 14*a* and 14*b* joined to each other.

Figure 11:
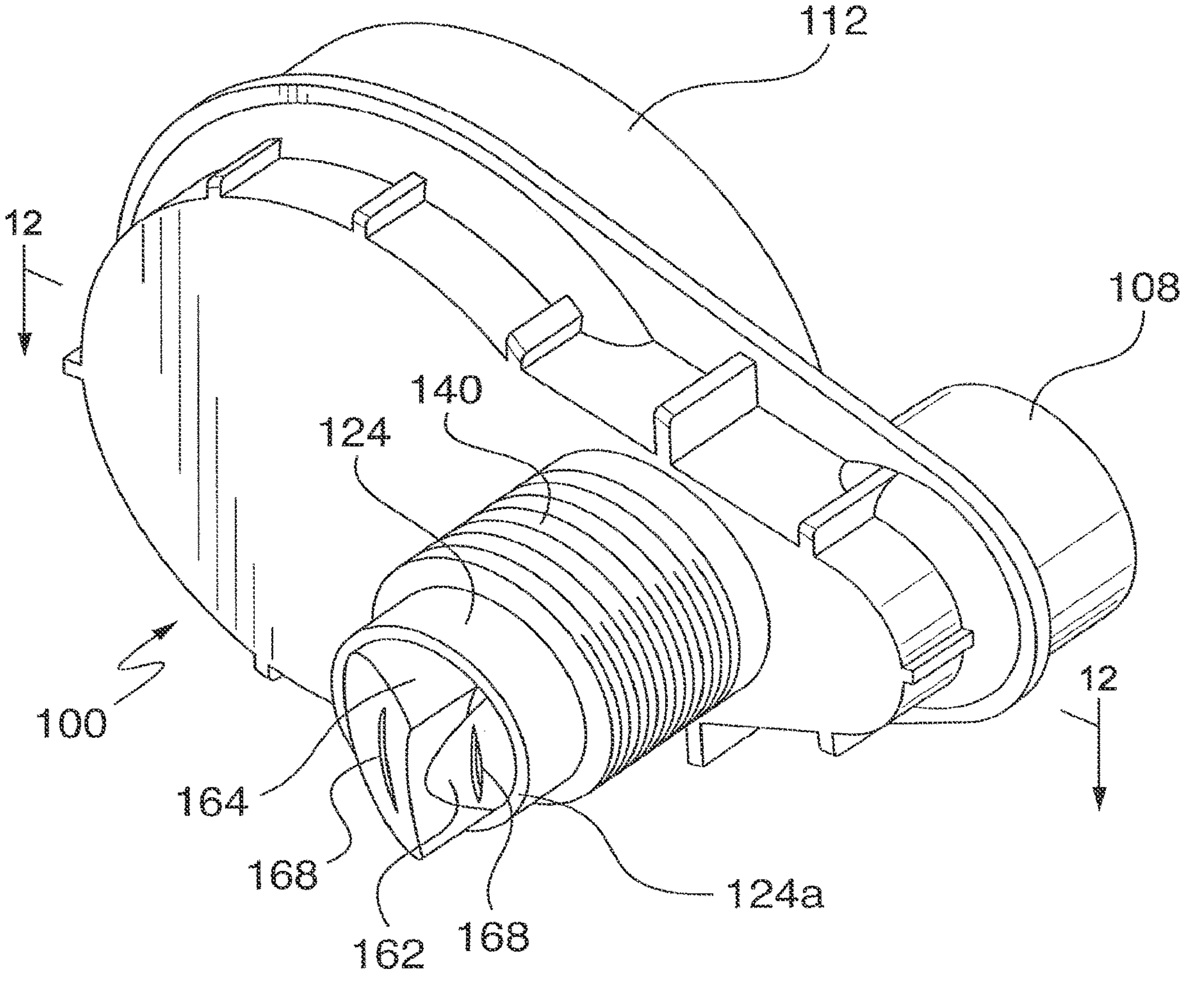
FIG. 11 is a perspective view of liners of the present invention inserted within the larger and smaller pathways of the common head of the inventive manifold of a dual cartridge assembly; and, FIG. 12 is a sectional view taken along lines 12-12 of FIG. 11.
Figure 12:
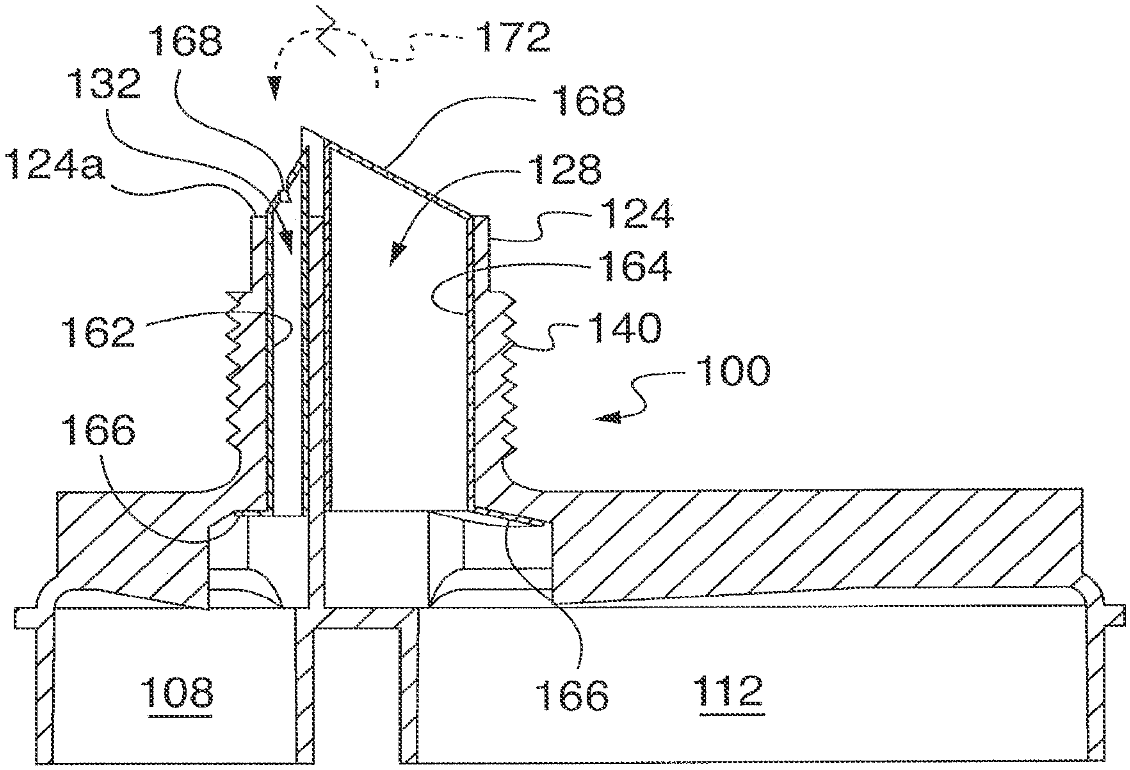

Referring now to FIGS. 11 and 12, the manifold 100 of the present invention is shown in combination with flexible liners 162, 164 of the present invention disposed within each of the two pathways 128, 132 of the manifold 100 to prevent the backflow problem described above. The flexible liners 162 and 164 are affixed within the manifold 100 in the same manner as described above, e.g., the flange portion 166 may be attached to an interior surface of the manifold 100 by any suitable means, e.g., epoxy glue. As described previously, each flexible liner 162 and 164 includes a tubular portion arranged to move between an expanded position (FIG. 12) during dispensing and a collapsed position (not shown) during interruption of dispensing. The tubular portion may extend beyond the discharge opening 124*a* and terminates at a slit opening 168 (FIG. 11) which acts as a one-way valve arranged to move between an open position to allow the passage of a reactive component through the liners 162, 164 and a normally closed position when dispensing is interrupted. In similar manner as described above, upon interruption in dispensing, the tubular portions and the slit openings 168 move from their open positions to their closed positions to preclude any unwanted backflow of reactive components as depicted by arrow 172 in FIG. 12.

The description herein is intended to illustrate possible implementations of the present invention and is not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon review of the disclosure. For example, functionally equivalent elements or method steps may be substituted for those specifically shown and described, and certain features may be used independently of other features, and in certain cases, particular locations of elements or sequence of method steps may be reversed or interposed, all without departing from the spirit or scope of the invention as defined herein. The scope of the claimed invention should therefore be determined with reference to the description above along with their full range of equivalents.

What is claimed:

1. A system for packaging and dispensing two-component fluids, the system comprising:

a. a first sausage pack including a casing preloaded with a first component to be dispensed, the first sausage pack having a larger cross-sectional size and being compressible as the first component is dispensed therefrom;

b. a second sausage pack including a casing preloaded with a second component reactive with the first component, and having a smaller cross-sectional size than the first sausage pack, the second sausage pack being compressible as the second component is dispensed therefrom;

c. a manifold having first and second inlet openings in communication with the first and second sausage packs, and arranged to receive the first and second components therefrom, the manifold including a rigid-walled common head having a circular cross-section and an interior surface, a length for passage of the first and second components therethrough, and a discharge opening; and, d. a partition positioned within the common head to define a first pathway having a larger cross-sectional size for passage of the first component therethrough, and a second pathway having a smaller cross-sectional size for passage of the second component therethrough, wherein the partition is formed of a web having a uniform thickness and a curved configuration along its entire width to form a convex surface and a concave surface, the partition including opposed side edges that join to or are integral with the interior surface of the common head along the entire length of the common head, wherein the partition remains flush with and does not extend beyond the discharge opening of the common head and is situated in an offset position within the common head, the convex surface forming a portion of the first pathway, and the concave surface forming a portion of the second pathway, the common head discharging the first and second components in a predetermined fixed ratio.

2. The system of claim 1, wherein the first and second sausage packs are arranged in a side-by-side relationship when in communication with the manifold.

3. The system of claim 1, wherein each of the first and second sausage packs contains a different reactive component.

4. The system of claim 1, wherein the first and second sausage packs are of equal capacity.

5. The system of claim 1, wherein the first and second sausage packs are of unequal capacity.

6. The system of claim 5, wherein the first and second sausage packs are provided in an unequal capacity of 2:1, 4:1, or 10:1.

7. The system of claim 1, wherein the common head is arranged for receiving the first and second components from the first and second sausage packs.

8. The system of claim 1, wherein the first and second sausage packs are arranged to be received within side-by-side barrels of a multi-component dispensing tool.

9. The system of claim 1, wherein each of the first and second sausage packs includes a front end that can be cut open to enable dispensing of the first and second components housed therein.

10. The system of claim 1, wherein the first component is an epoxy resin and the second component is a hardener.

11. The system of claim 1, wherein the first component is a single component, and wherein the second component is a single component.

12. The system of claim 11, wherein the first component is a basic component and the second component is a catalyst component.

13. The system of claim 1, wherein the curved configuration of the partition has an arc length that is less than a semicircle.

* * * * *